US012567642B2

(12) United States Patent (10) Patent No.: US 12,567,642 B2

Maguire et al. (45) Date of Patent: Mar. 3, 2026

(54) SHIM SYSTEMS FOR TRACTION BATTERY PACKS

(71) Applicant: FORD GLOBAL TECHNOLOGIES, LLC, Dearborn, MI (US)

(72) Inventors: Patrick Daniel Maguire, Ann Arbor, MI (US); Che-Chun Chang, Ann Arbor, MI (US); Marc Dugas, Wixom, MI (US); Mohammadreza Eftekhari, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 708 days.

(21) Appl. No.: 17/946,425

(22) Filed: Sep. 16, 2022

(65) Prior Publication Data

US 2023/0327265 A1 Oct. 12, 2023

Related U.S. Application Data

(60) Provisional application No. 63/322,766, filed on Mar. 23, 2022.

(51) Int. Cl.
| | |
|---|---|
| *H01M 50/291* | (2021.01) |
| *B60K 1/04* | (2019.01) |
| *H01M 50/209* | (2021.01) |
| *H01M 50/249* | (2021.01) |
| *H01M 50/264* | (2021.01) |

(52) U.S. Cl.
CPC ....... *H01M 50/291* (2021.01); *H01M 50/209* (2021.01); *H01M 50/249* (2021.01); *H01M 50/264* (2021.01); *B60K 1/04* (2013.01); *B60K 2001/0438* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 8,089,248 | B2 | 1/2012 | Tabatowski-Bush |
| 8,968,912 | B2 | 3/2015 | Maguire et al. |
| 9,217,781 | B2 | 12/2015 | Tabatowski-Bush et al. |
| 9,263,713 | B2 | 2/2016 | Kim |

(Continued)

FOREIGN PATENT DOCUMENTS

| | | |
|---|---|---|
| CN | 101860053 A | 10/2010 |
| CN | 101860053 B | 4/2015 |

(Continued)

OTHER PUBLICATIONS

Machine Translation of DE-202017104111-U1 (Year: 2018).*

(Continued)

*Primary Examiner* — Gregg Cantelmo

(74) *Attorney, Agent, or Firm* — David B. Kelley; Carlson, Gaskey & Olds, P.C.

(57) ABSTRACT

Traction battery packs are disclosed that include battery systems. A cell stack/cell matrix of the battery system may be positioned within an enclosure tray of the traction battery pack. A wedge insert may be positioned at an interface between the cell stack/cell matrix and a side wall of the enclosure tray. The side wall may include a draft angle. The wedge insert may be configured to translate the draft angle in order to apply a compressive load in a direction that is substantially normal to the cell stack/cell matrix.

12 Claims, 5 Drawing Sheets

(56) References Cited

U.S. PATENT DOCUMENTS

| | | | |
|---|---|---|---|
| 9,425,628 B2 | 8/2016 | Pham et al. | |
| 9,446,680 B2 | 9/2016 | Chen et al. | |
| 9,515,357 B2 | 12/2016 | Haskins et al. | |
| 9,799,932 B2 | 10/2017 | Haskins et al. | |
| 10,109,897 B2 | 10/2018 | Haskins et al. | |
| 10,566,647 B2 | 2/2020 | Andryukov et al. | |
| 10,601,006 B2 | 3/2020 | Maguire et al. | |
| 10,608,222 B2 | 3/2020 | Montgomery et al. | |
| 10,759,281 B2 | 9/2020 | Miller et al. | |
| 10,784,495 B2 | 9/2020 | Fernandez-Galindo et al. | |
| 11,005,131 B2 | 5/2021 | Zhou et al. | |
| 11,024,913 B2 | 6/2021 | Subramanian et al. | |
| 11,050,125 B1 | 6/2021 | Zhu et al. | |
| 11,114,726 B2 | 9/2021 | Gu et al. | |
| 11,128,009 B2 | 9/2021 | Chen et al. | |
| 11,139,537 B2 | 10/2021 | Wu et al. | |
| 11,217,847 B2 | 1/2022 | Eftekhari et al. | |
| 11,258,119 B2 | 2/2022 | Wang et al. | |
| 11,264,669 B2 | 3/2022 | Jiang | |
| 11,283,130 B2 | 3/2022 | Chen et al. | |
| 11,289,750 B2 | 3/2022 | Zhou et al. | |
| 11,302,972 B2 | 4/2022 | Chu et al. | |
| 11,302,973 B2 | 4/2022 | Maguire et al. | |
| 11,302,990 B2 | 4/2022 | Huang et al. | |
| 11,329,346 B2 | 5/2022 | Seki et al. | |
| 11,329,347 B2 | 5/2022 | Huang et al. | |
| 11,335,960 B2 | 5/2022 | Wang et al. | |
| 11,362,392 B2 | 6/2022 | Wang et al. | |
| 11,362,393 B2 | 6/2022 | Wang et al. | |
| 11,387,519 B2 | 7/2022 | Huang et al. | |
| 11,404,744 B1 | 8/2022 | Yang et al. | |
| 11,417,932 B2 | 8/2022 | Tang et al. | |
| 11,417,936 B2 | 8/2022 | Wang et al. | |
| 2009/0239137 A1* | 9/2009 | Kakuchi | H01M 50/271 |
| | | | 429/151 |
| 2010/0259221 A1 | 10/2010 | Tabatowski-Bush | |
| 2013/0164592 A1 | 6/2013 | Maguire et al. | |
| 2016/0126514 A1* | 5/2016 | Suzuki | H01M 50/209 |
| | | | 429/154 |
| 2017/0104251 A1 | 4/2017 | Wang | |
| 2019/0067656 A1* | 2/2019 | Zhang | H01M 50/289 |
| 2019/0305389 A1 | 10/2019 | Poirier et al. | |
| 2020/0091494 A1 | 3/2020 | Fernandez-Galindo et al. | |
| 2020/0203684 A1 | 6/2020 | Chen et al. | |
| 2020/0203779 A1 | 6/2020 | Wang et al. | |
| 2020/0212387 A1 | 7/2020 | Su et al. | |
| 2020/0212397 A1 | 7/2020 | Wang et al. | |
| 2020/0212418 A1 | 7/2020 | Chen et al. | |
| 2020/0381697 A1 | 12/2020 | Fernandez-Galindo et al. | |
| 2020/0411819 A1* | 12/2020 | Seki | H01M 50/269 |
| 2021/0066686 A1 | 3/2021 | Siewert et al. | |
| 2021/0091348 A1 | 3/2021 | Lateef et al. | |
| 2021/0091437 A1 | 3/2021 | Chen et al. | |
| 2021/0104798 A1 | 4/2021 | Jiang et al. | |
| 2021/0119279 A1 | 4/2021 | Wang et al. | |
| 2021/0218117 A1 | 7/2021 | Zhu et al. | |
| 2021/0229541 A1 | 7/2021 | Smith et al. | |
| 2021/0305641 A1 | 9/2021 | Bai et al. | |
| 2021/0305642 A1 | 9/2021 | Bai et al. | |
| 2021/0320349 A1 | 10/2021 | Jiang et al. | |
| 2021/0320372 A1 | 10/2021 | Jiang et al. | |
| 2021/0402863 A1 | 12/2021 | Huang et al. | |
| 2021/0408634 A1 | 12/2021 | Yin et al. | |
| 2022/0052414 A1 | 2/2022 | Huang et al. | |
| 2022/0052415 A1 | 2/2022 | Huang et al. | |
| 2022/0059897 A1 | 2/2022 | Huang et al. | |
| 2022/0059902 A1 | 2/2022 | Jiang et al. | |
| 2022/0077521 A1 | 3/2022 | Jin et al. | |
| 2022/0085450 A1 | 3/2022 | Chu et al. | |
| 2022/0102800 A1 | 3/2022 | Wang et al. | |
| 2022/0109211 A1 | 4/2022 | Wang et al. | |
| 2022/0123394 A1 | 4/2022 | Zhang et al. | |
| 2022/0123423 A1 | 4/2022 | Wang et al. | |
| 2022/0149458 A1 | 5/2022 | Jiang et al. | |
| 2022/0158296 A1 | 5/2022 | Chen et al. | |
| 2022/0185088 A1 | 6/2022 | Zhang et al. | |
| 2022/0190416 A1 | 6/2022 | Wu | |
| 2022/0190423 A1 | 6/2022 | Wu et al. | |
| 2022/0216555 A1 | 7/2022 | Huang et al. | |
| 2022/0221084 A1 | 7/2022 | Huang et al. | |
| 2022/0231370 A1 | 7/2022 | Yang et al. | |
| 2022/0231371 A1 | 7/2022 | Jiang et al. | |
| 2022/0255172 A1 | 8/2022 | Guo et al. | |

FOREIGN PATENT DOCUMENTS

| | | | | |
|---|---|---|---|---|
| CN | 206849882 U | 1/2018 | | |
| CN | 107757374 A | 3/2018 | | |
| CN | 208738329 U | 4/2019 | | |
| CN | 209016158 U | 6/2019 | | |
| CN | 209045657 U | 6/2019 | | |
| CN | 110048042 A | 7/2019 | | |
| CN | 209071465 U | 7/2019 | | |
| CN | 209104196 U | 7/2019 | | |
| CN | 209104221 U | 7/2019 | | |
| CN | 209104222 U | 7/2019 | | |
| CN | 209104228 U | 7/2019 | | |
| CN | 209104229 U | 7/2019 | | |
| CN | 209104230 U | 7/2019 | | |
| CN | 209104232 U | 7/2019 | | |
| CN | 209104234 U | 7/2019 | | |
| CN | 209104235 U | 7/2019 | | |
| CN | 209104236 U | 7/2019 | | |
| CN | 209104237 U | 7/2019 | | |
| CN | 209104238 U | 7/2019 | | |
| CN | 209104242 U | 7/2019 | | |
| CN | 209104331 U | 7/2019 | | |
| CN | 209183581 U | 7/2019 | | |
| CN | 209183604 U | 7/2019 | | |
| CN | 209183605 U | 7/2019 | | |
| CN | 209183611 U | 7/2019 | | |
| CN | 209183612 U | 7/2019 | | |
| CN | 209183614 U | 7/2019 | | |
| CN | 209249637 U | 8/2019 | | |
| CN | 209357799 U | 9/2019 | | |
| CN | 209401679 U | 9/2019 | | |
| CN | 209401680 U | 9/2019 | | |
| CN | 209401682 U | 9/2019 | | |
| CN | 209401684 U | 9/2019 | | |
| CN | 209401715 U | 9/2019 | | |
| CN | 209447908 U | 9/2019 | | |
| CN | 110350256 A | 10/2019 | | |
| CN | 110416448 A | 11/2019 | | |
| CN | 209592271 U | 11/2019 | | |
| CN | 209607884 U | 11/2019 | | |
| CN | 209641720 U | 11/2019 | | |
| CN | 209710493 U | 11/2019 | | |
| CN | 209730104 U | 12/2019 | | |
| CN | 209747621 U | 12/2019 | | |
| CN | 209787546 U | 12/2019 | | |
| CN | 209843820 U | 12/2019 | | |
| CN | 209936788 U | 1/2020 | | |
| CN | 110931700 A | 3/2020 | | |
| CN | 210136922 U | 3/2020 | | |
| CN | 210136943 U | 3/2020 | | |
| CN | 210182435 U | 3/2020 | | |
| CN | 210566905 U | 5/2020 | | |
| CN | 111354885 A | 6/2020 | | |
| CN | 210744037 U | 6/2020 | | |
| CN | 111384314 B | 1/2021 | | |
| CN | 111384325 B | 2/2021 | | |
| CN | 112310525 A | 2/2021 | | |
| CN | 112331982 A | 2/2021 | | |
| CN | 109742281 B | 5/2021 | | |
| CN | 111354987 B | 5/2021 | | |
| CN | 111384337 B | 5/2021 | | |
| CN | 113300044 A | * | 8/2021 | H01M 50/204 |
| CN | 112331981 B | 9/2021 | | |
| CN | 112331997 B | 11/2021 | | |
| CN | 113871789 A | 12/2021 | | |
| CN | 112310541 B | 3/2022 | | |
| CN | 216054919 U | 3/2022 | | |
| CN | 216120549 U | 3/2022 | | |
| CN | 216120659 U | 3/2022 | | |

(56)       References Cited

FOREIGN PATENT DOCUMENTS

| | | | | |
|---|---|---|---|---|
| CN | 216213898 | U | 4/2022 | |
| CN | 216354437 | U | 4/2022 | |
| CN | 216354439 | U | 4/2022 | |
| CN | 111430826 | B | 6/2022 | |
| CN | 216720168 | U | 6/2022 | |
| CN | 216720172 | U | 6/2022 | |
| CN | 216750072 | U | 6/2022 | |
| CN | 216750142 | U | 6/2022 | |
| CN | 216872085 | U | 7/2022 | |
| CN | 216903107 | U | 7/2022 | |
| CN | 216903128 | U | 7/2022 | |
| CN | 216903497 | U | 7/2022 | |
| DE | 102016119118 | A1 | 4/2017 | |
| DE | 102017121796 | A1 | 3/2018 | |
| DE | 202017104111 | U1 * | 11/2018 | ............. B23P 19/02 |
| DE | 102019108631 | A1 | 10/2019 | |
| DE | 102019125140 | A1 | 3/2020 | |
| DE | 102020124986 | A1 | 3/2021 | |
| DE | 102021101385 | A1 | 9/2021 | |
| EP | 3671904 | A1 | 6/2020 | |
| EP | 3671940 | A1 | 6/2020 | |
| EP | 3672377 | A1 | 6/2020 | |
| EP | 3675204 | A1 | 7/2020 | |
| EP | 3675207 | A1 | 7/2020 | |
| EP | 3675216 | B1 | 7/2020 | |
| EP | 3675217 | A1 | 7/2020 | |
| EP | 3675220 | A1 | 7/2020 | |
| EP | 3675221 | A1 | 7/2020 | |
| EP | 3675236 | A1 | 7/2020 | |
| EP | 3675271 | A1 | 7/2020 | |
| EP | 3798491 | A1 | 3/2021 | |
| EP | 3799150 | A1 | 3/2021 | |
| EP | 3799151 | A1 | 3/2021 | |
| EP | 3905366 | A1 | 3/2021 | |
| EP | 3806231 | A1 | 4/2021 | |
| EP | 3852187 | A1 | 7/2021 | |
| EP | 3920255 | A1 | 8/2021 | |
| EP | 3883005 | A1 | 9/2021 | |
| EP | 3883006 | A1 | 9/2021 | |
| EP | 3883042 | A1 | 9/2021 | |
| EP | 3886198 | A1 | 9/2021 | |
| EP | 3886200 | A1 | 9/2021 | |
| EP | 3886201 | A1 | 9/2021 | |
| EP | 3671893 | B1 | 11/2021 | |
| EP | 3699979 | B1 | 11/2021 | |
| EP | 3920315 | A1 | 12/2021 | |
| EP | 3930027 | A1 | 12/2021 | |
| EP | 3944397 | A1 | 1/2022 | |
| EP | 3944398 | A1 | 1/2022 | |
| EP | 3955333 | A1 | 2/2022 | |
| EP | 3799194 | B1 | 3/2022 | |
| EP | 3985787 | A1 | 4/2022 | |
| EP | 3799153 | B1 | 6/2022 | |
| JP | 2010246372 | A | 10/2010 | |
| JP | 2018032519 | A * | 3/2018 | |
| JP | 6680145 | B2 | 4/2020 | |
| JP | 6926989 | B2 | 8/2021 | |
| KR | 1020100112530 | A | 10/2010 | |
| KR | 101695641 | B1 | 1/2017 | |
| WO | WO-2019118849 | A1 * | 6/2019 | |
| WO | WO-2022229000 | A1 * | 11/2022 | .......... H01M 50/209 |

OTHER PUBLICATIONS

Machine Translation of JP-2018032519-A (Year: 2018).*
Machine Translation of WO-2022229000-A1 (Year: 2022).*
Machine Translation of WO-2019118849-A1 (Year: 2019).*
Machine Translation of CN-113300044-A (Year: 2021).*

* cited by examiner

SHIM SYSTEMS FOR TRACTION BATTERY PACKS

CROSS-REFERENCE TO RELATED APPLICATIONS

This disclosure claims priority to U.S. Provisional Application No. 63/322,766, which was filed on Mar. 23, 2022 and is incorporated herein by reference.

TECHNICAL FIELD

This disclosure relates generally to traction battery packs, and more particularly to shim systems adapted for providing shimming and wedging functions within traction battery packs that include a battery system, such as a cell-to-pack battery system.

BACKGROUND

Electrified vehicles include a drivetrain having one or more electric machines. The electric machines can drive the electrified vehicles instead of, or in addition to, an internal combustion engine. A traction battery pack can power the electric machines and other electrical loads of the vehicle. Conventional traction battery packs include groupings of battery cells called battery arrays. The battery arrays include various array support structures (e.g., array frames, spacers, rails, walls, end plates, bindings, etc.) that are arranged for grouping and supporting the battery cells in multiple individual units inside the traction battery pack enclosure.

SUMMARY

A traction battery pack according to an exemplary aspect of the present disclosure includes, among other things, an enclosure assembly including an enclosure tray, a battery system housed within the enclosure assembly and including a cell matrix, and a wedge insert that establishes an interface between a draft angle of a side wall of the enclosure tray and the cell matrix.

In a further non-limiting embodiment of the foregoing traction battery pack, the wedge insert is secured to a minor side of the cell matrix.

In a further non-limiting embodiment of either of the foregoing traction battery packs, the wedge insert is secured to a cell stack of the cell matrix.

In a further non-limiting embodiment of any of the foregoing traction battery packs, the enclosure tray provides a cell-compressing opening for compressing the cell matrix.

In a further non-limiting embodiment of any of the foregoing traction battery packs, the side wall of the enclosure tray establishes part of the cell-compressing opening.

In a further non-limiting embodiment of any of the foregoing traction battery packs, the wedge insert includes a first side face that interfaces with the draft angle of the side wall and a second side face that interfaces with the cell matrix.

In a further non-limiting embodiment of any of the foregoing traction battery packs, the first side face includes a first profile and the second side face includes a second, different profile.

In a further non-limiting embodiment of any of the foregoing traction battery packs, the first profile is sloped or angled and the second profile is flat.

In a further non-limiting embodiment of any of the foregoing traction battery packs, an adhesive is disposed between the first side face and the side wall and further between the second side face and the cell matrix.

In a further non-limiting embodiment of any of the foregoing traction battery packs, the first side face includes a first angled surface and a second angled surface that converge together at an apex of the first side face.

In a further non-limiting embodiment of any of the foregoing traction battery packs, the wedge insert includes a stepped profile.

In a further non-limiting embodiment of any of the foregoing traction battery packs, the stepped profile establishes a lip that is received over top of a portion of the cell matrix.

A method according to another exemplary aspect of the present disclosure includes, among other things, positioning a wedge insert between a side wall that establishes a draft angle of an enclosure tray of a traction battery pack and a cell matrix of a battery system of the traction battery pack.

In a further non-limiting embodiment of the foregoing method, the wedge insert is positioned between the draft angle and a cell stack of the cell matrix.

In a further non-limiting embodiment of either of the foregoing methods, the wedge insert is part of a shim system that includes a plurality of wedge inserts positioned between the side wall and the cell matrix.

In a further non-limiting embodiment of any of the forgoing methods, the wedge insert is secured to both the side wall and the cell matrix by an adhesive.

In a further non-limiting embodiment of any of the forgoing methods, the wedge insert includes a first side face that interfaces with the draft angle and a second side face that interfaces with the cell matrix.

In a further non-limiting embodiment of any of the forgoing methods, the first side face includes a first angled surface and a second angled surface that converge together at an apex of the first side face.

In a further non-limiting embodiment of any of the forgoing methods, the first side face includes a first profile and the second side face includes a second, different profile.

In a further non-limiting embodiment of any of the forgoing methods, the first profile is sloped or angled and the second profile is flat.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details traction battery packs that include battery systems, such as cell-to-pack battery systems. A cell stack/cell matrix of the battery system may be positioned within an enclosure tray of the traction battery pack. A wedge insert may be positioned at an interface between the cell stack/cell matrix and a side wall of the enclosure tray. The side wall may include a draft angle. The wedge insert may be configured to translate the draft angle in order to apply a compressive load in a direction that is substantially normal to the cell stack/cell matrix. These and other features are discussed in greater detail in the following paragraphs of this detailed description.

Figure 1:
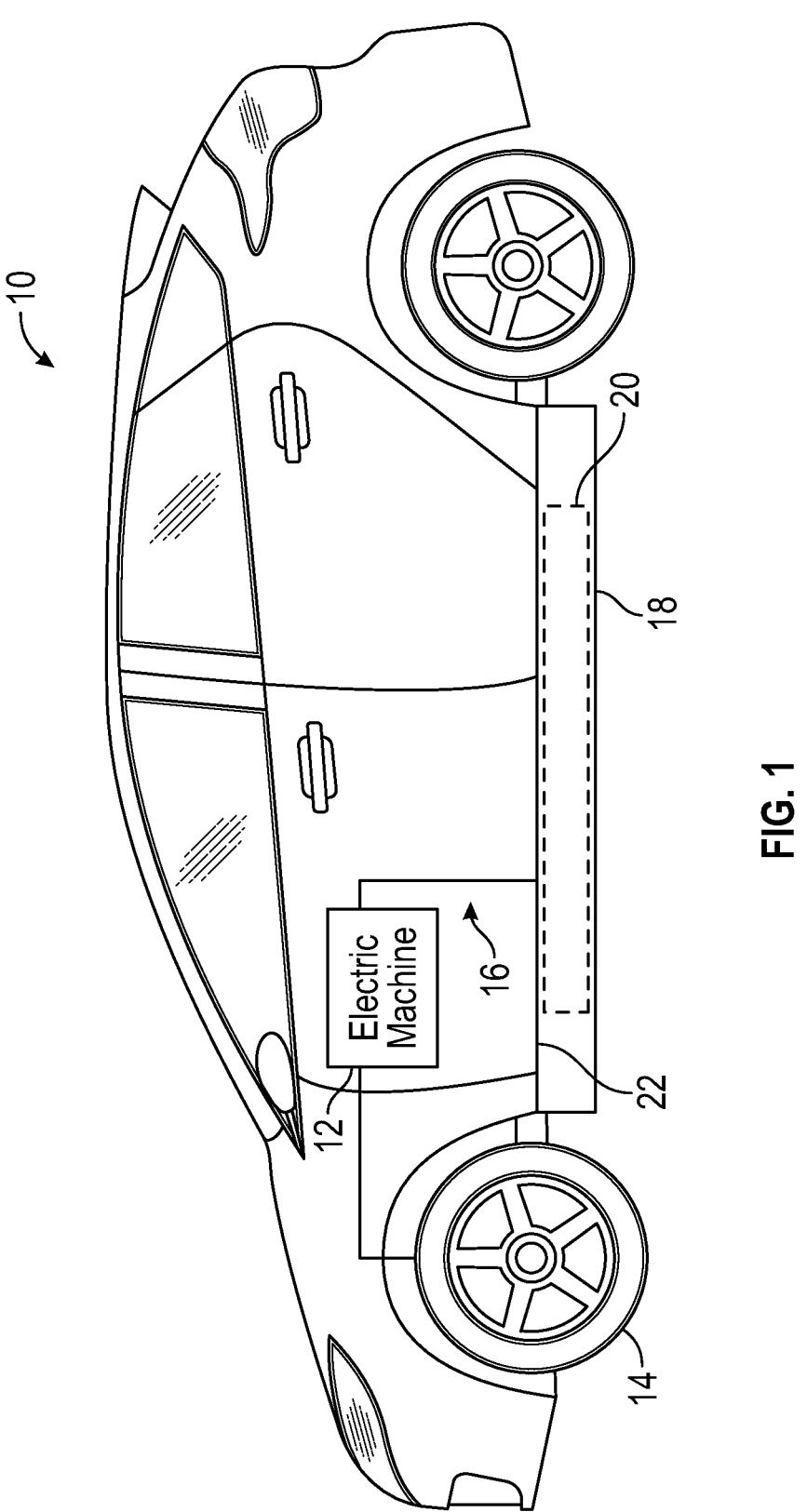
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In an embodiment, the electrified vehicle 10 is a car. However, the electrified vehicle 10 could alternatively be a pickup truck, a van, a sport utility vehicle (SUV), or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more drive wheels 14 of the electrified vehicle 10.

A voltage bus 16 may electrically couple the electric machine 12 to a traction battery pack 18. The traction battery pack 18 is capable of outputting electrical power to power the electric machine 12 and/or other electrical loads of the electrified vehicle 10.

The traction battery pack 18 may be secured to an underbody 22 of the electrified vehicle 10. However, the traction battery pack 18 could be located elsewhere on the electrified vehicle 10 within the scope of this disclosure.

The traction battery pack 18 is an exemplary electrified vehicle battery. The traction battery pack 18 may be a high voltage traction battery pack that includes a cell-to-pack battery system 20. Unlike conventional traction battery pack battery systems, the cell-to-pack battery system 20 incorporates battery cells or other energy storage devices without the cells being arranged in individual arrays or modules. The cell-to-pack battery system 20 therefore eliminates most if not all the array support structures (e.g., array frames, spacers, rails, walls, end plates, bindings, etc.) necessary for grouping the battery cells into the arrays/modules. Further, the cell-to-pack battery system 20 may provide the total high voltage bus electrical potential of the traction battery pack 18 with a single battery unit as opposed to conventional battery systems that require multiple individual battery arrays/modules that must be connected together after being positioned within the battery enclosure for achieving the total high voltage electrical potential.

Figure 2:
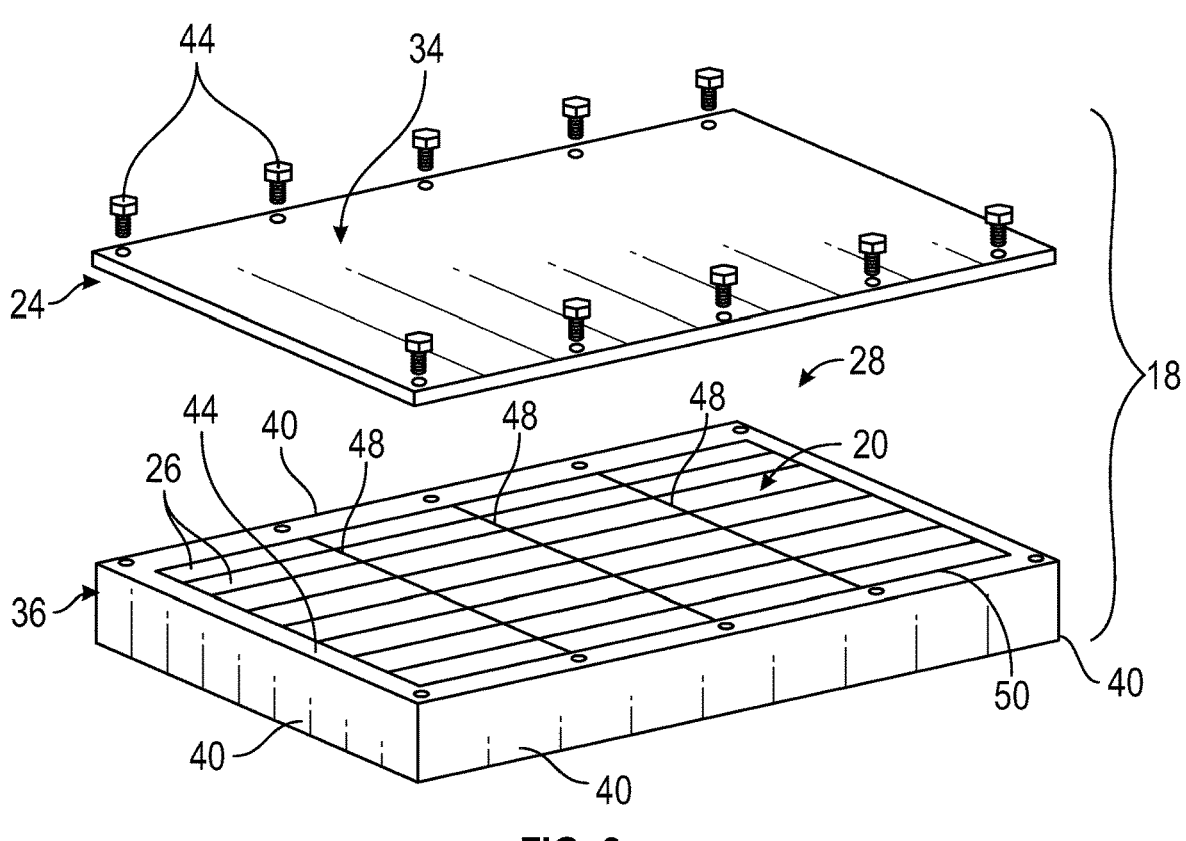
FIG. 2 illustrates a traction battery pack of the electrified vehicle of FIG. 1.
Figure 3:
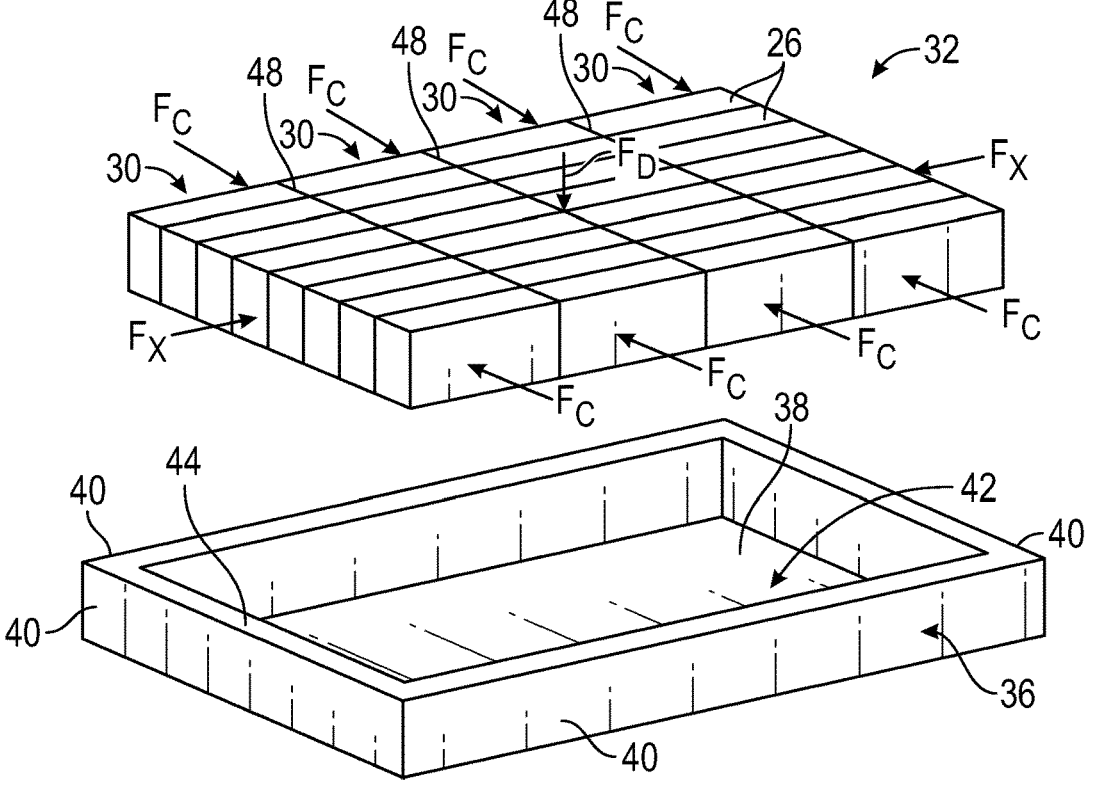
FIG. 3 illustrates a cell-to-pack battery system of the traction battery pack of FIG. 2.

Referring now to FIGS. 2 and 3, the traction battery pack 18 may include an enclosure assembly 24 that is arranged for housing the cell-to-pack battery system 20. In an embodiment, the cell-to-pack battery system 20 includes a plurality of battery cells 26 that are held within an interior area 28 established by the enclosure assembly 24.

The battery cells 26 may supply electrical power to various components of the electrified vehicle 10. The battery cells 26 may be stacked side-by-side relative to one another to construct a cell stack 30, and the cell stacks 30 may be positioned side-by-side in rows to provide a cell matrix 32.

In an embodiment, each cell stack 30 includes eight individual battery cells 26, and the cell matrix 32 includes four cell stacks 30 for a total of thirty-two battery cells 26. Providing an even quantity of battery cells 26 and an even quantity of cell stacks 30 can help to support an efficient electrical bussing arrangement. Although a specific number of battery cells 26 and cells stacks 30 are illustrated in the various figures of this disclosure, the cell-to-pack battery system 20 of the traction battery pack 18 could include any number of battery cells 26 and any number of cell stacks 30. In other words, this disclosure is not limited to the exemplary configuration shown in FIGS. 2 and 3.

In an embodiment, the battery cells 26 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure assembly 24 of the traction battery pack 18 may include an enclosure cover 34 and an enclosure tray 36. The enclosure cover 34 may be secured to the enclosure tray 36 to provide the interior area 28 for housing the cell-to-pack battery system 20.

The enclosure tray 36 may include a floor 38 and a plurality of side walls 40 arranged relative to one another to provide a cell-compressing opening 42. The floor 38 and the side walls 40 may be mechanically coupled to one another, such as by welding, for example.

During assembly of the traction battery pack 18, the enclosure cover 34 may be secured to the enclosure tray 36 at an interface 44 that substantially circumscribes the interior area 28. In some implementations, mechanical fasteners 46 may be used to secure the enclosure cover 34 to the enclosure tray 36, although other fastening methodologies (adhesion, etc.) could also be suitable.

The cell matrix 32 of the cell-to-pack battery system 20 may be positioned within the cell-compressing opening 42 provided by the enclosure tray 36. The exemplary enclosure tray 36 is depicted as including a single cell-compressing opening 42, however it should be understood that this disclosure extends to structural assemblies that provide one or more cell-compressing openings. The enclosure cover 34 may cover the cell matrix 32 within the cell-compressing opening 42 to substantially surround the battery cells 26 on all sides. Once fully assembled and positioned relative to the enclosure tray 36, the cell matrix 32 may establish a single battery unit capable of providing the total high voltage bus electrical potential of the traction battery pack 18.

The enclosure tray 36 may compress and hold the cell matrix 32 when the cell matrix 32 is received within the cell-compressing opening 42. In an embodiment, the side walls 40 of the enclosure tray 36 apply forces to the cell matrix 32 when the cell matrix 32 is positioned within the cell-compressing opening 42.

In an embodiment, in order to insert the cell matrix 32 into the cell-compressing opening 42, the cell matrix 32 may first be compressed, and then, while compressed, moved into place in the cell-compressing opening 42. A compressive force Fc may be applied to opposed ends of one of the cell stacks 30. The compressive force Fc essentially squeezes the battery cells 26 within the cell stack 30, thereby compressing the cell stack 30 and the individual battery cells 26 to a reduced thickness. While the compressive force Fc is applied to the cell stack 30, the cell stack 30 may be inserted into a respective cell-compressing opening 42 by a downward force FD. The downward force FD may be applied directly to one or more of the battery cells 26.

While the term "downward" is used herein to describe the downward force FD, it should be understood that the term "downward" is used herein to refer to all forces tending to press a cell stack 30 into a cell-compressing opening 42. In particular, the term "downward" refers to all forces substantially perpendicular to the compressive forces Fc, whether or not the force is truly in a "downward" direction. For example, this disclosure extends to cell stacks that are compressed and inserted into a cell-compressing opening in a sideways direction.

The cell stacks 30 could be individually compressed and inserted into the cell-compressing opening 42. In another embodiment, the entire cell matrix 32 is compressed and inserted into the cell-compressing opening 42. As schematically shown in FIG. 3, in such an embodiment, additional compressive forces F_x can compress the cell stacks 30 together for insertion of the cell matrix 32 into the cell-compressing opening 42. The compressive forces F_x are generally perpendicular to the compressive forces Fc. The compressive forces F_x may be applied together with the compressive forces Fc. The force FD may then be applied to move the entire cell matrix 32 into the cell-compressing opening 42.

In an embodiment, an entire perimeter of the cell-compressing opening 42 is defined by the side walls 40 of the enclosure tray 36. The side walls 40 can apply a compressive force to the battery cells 26 about the entire perimeter of the cell matrix 32. The side walls 40 may therefore function as a rigid halo-type structure that compresses and tightly holds the cell matrix 32.

The configuration described above may be considered to be a cell-to-pack type battery pack, which differs from conventional battery pack types that include enclosures holding arrays of battery cells enclosed by array support structures that are spaced apart from walls of a battery enclosure, and where the battery enclosure does not apply compressive forces to any of the battery cells. The cell-to-pack type battery pack described herein also eliminates the rigid cross members that are commonly secured to the enclosure tray of conventional traction battery backs for providing mounting points for securing the battery arrays and the enclosure cover.

The cell-to-pack battery system 20 may further include one or more cell row separators 48. In an embodiment, one cell row separator 48 is positioned between each adjacent pair of cell stacks 30 of the cell matrix 32. In other embodiments, two cell row separators 48 are provided with each cell stack 30. However, the total number of cell row separators 48 provided within the cell-to-pack battery system 20 is not intended to limit this disclosure.

FIGS. 4, 5, 6, and 7, with continued reference to FIGS. 1-3, illustrate various aspects related to a shim system 50 that can be utilized within the traction battery pack 18 having the cell-to-pack battery system 20. One or more side walls 40 of the enclosure tray 36 may include a draft angle α (see FIG. 5) and therefore may not exhibit a profile that neatly accommodates the sum of the battery cells 26 of the cell matrix 32. Moreover, tolerance variations can result from piece-to-piece dimensional variations among the battery cells 26 that can cause some cell stacks 30 of the cell matrix 32 to be different lengths than other cell stacks 30. The shim system 50 may therefore be incorporated into the cell-to-pack battery system 20 for both controlling the compressive forces (e.g., compressive forces F_x and/or compressive forces Fc) applied to the cell matrix 32 and for filling in the gaps caused by the tolerance variations within the cell stacks 30 of the cell matrix 32.

The shim system 50 may include one or more wedge inserts 52. The wedge inserts 52 may be positioned relative to the cell matrix 32 either before or after inserting the cell matrix 32 into the cell-compressing opening 42 of the enclosure tray 36. Further, the wedge inserts 52 may be secured (e.g., via an adhesive or mechanical feature) to the cell matrix 32, the enclosure tray 36, or both.

Figures 8, 9:
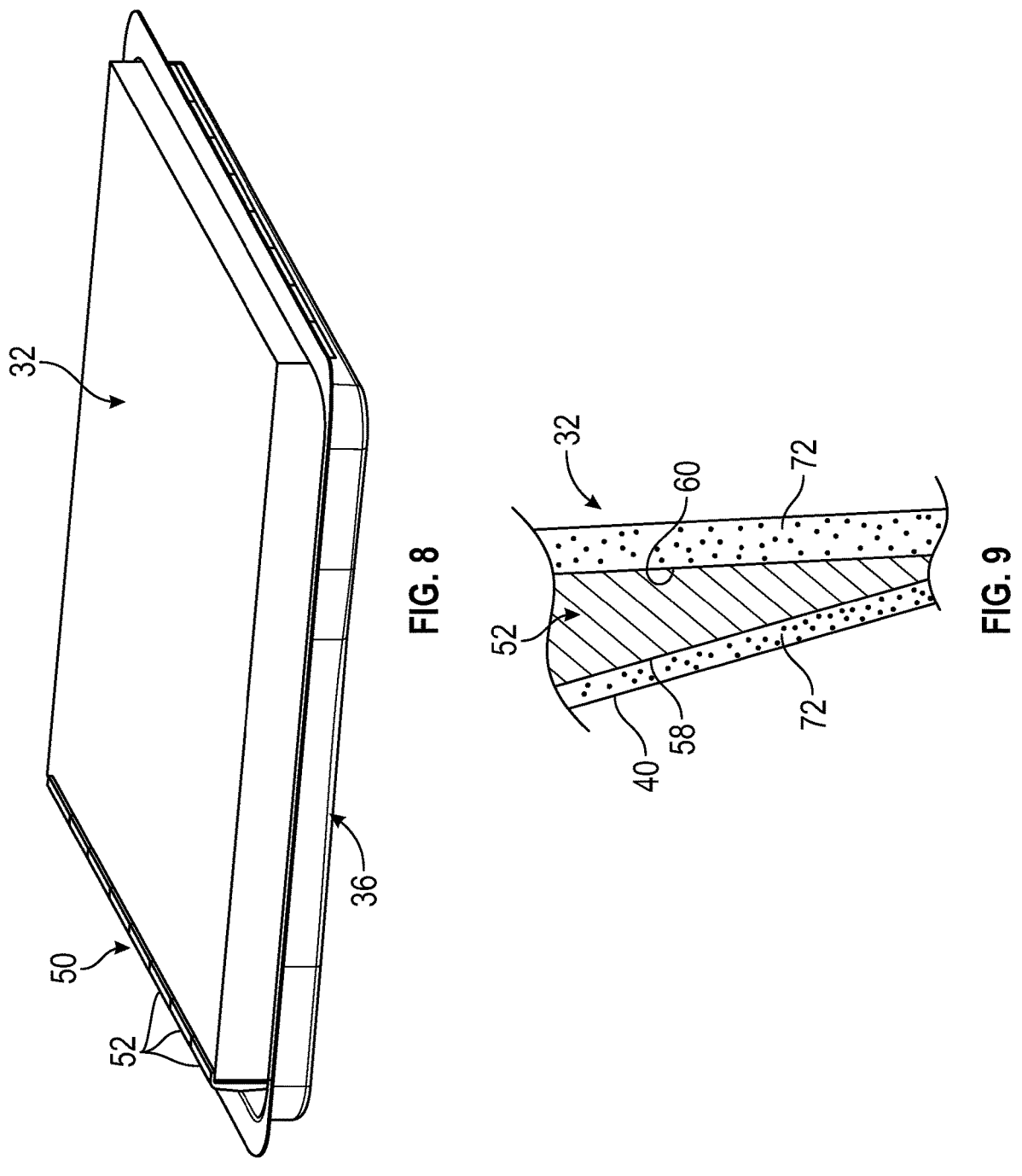
FIG. 8 illustrates another exemplary shim system for a traction battery pack.

In an embodiment, one or more wedge inserts 52 may be positioned between the enclosure tray 36 and at least two sides (e.g., minor sides 54) of the cell matrix 32. The wedge inserts 52 of the shim system 50 may therefore interface with at least two cell stacks 30 of the cell matrix 32, with a first portion P1 of the wedge inserts 52 being positioned at a first side of the cell matrix 32 and a second portion P2 of the wedge inserts 52 being positioned at a second, opposite side of the cell matrix 32. In other implementations, the wedge inserts 52 of the shim system 50 may be positioned relative to only a single side of the cell matrix 32, and therefore the shim system 50 could be arranged to interface with only one cell stack 30 of the cell matrix 32 (see, e.g., the embodiment of FIG. 8). Thus, the total number of wedge inserts 52 provided as part of the shim system 50 for the cell-to-pack battery system 20 could vary and is not intended to limit this disclosure.

In addition to functioning as a shim for addressing tolerance stack-up issues, each wedge insert 52 of the shim system 50 may establish an interface that translates or "squares" the draft angle α of the side wall(s) 40 of the enclosure tray 36 relative to the cell stack 30/cell matrix 32. The wedge inserts 52 therefore facilitate the transfer of compression loads 99 imparted by the cell-compressing opening 42 to the cell matrix 32, and may further ensure that the compressive loads 99 are applied in a direction that is substantially normal (i.e., perpendicular) to the cell stack 30/cell matrix 32. A depth D of insertion of each wedge insert 52 may be controlled to impart either a greater or lesser amount of compressive load onto the cell stack 30/cell matrix 32.

The functionality provided by the wedge inserts 52 described herein may be particularly beneficial for traction battery packs that include cell-to-pack type battery systems because the array support structures traditionally provided within battery arrays have been largely eliminated from the cell-to-pack battery system 20, and the rigid cross members traditionally provided for establishing mounting points for securing battery cell groupings have been eliminated from the enclosure tray 36. By virtue of the wedge inserts 52, the cell matrix 32 can be inserted directly into the enclosure tray 36 without the need for banding or other retention structures.

Figures 4, 5, 9:
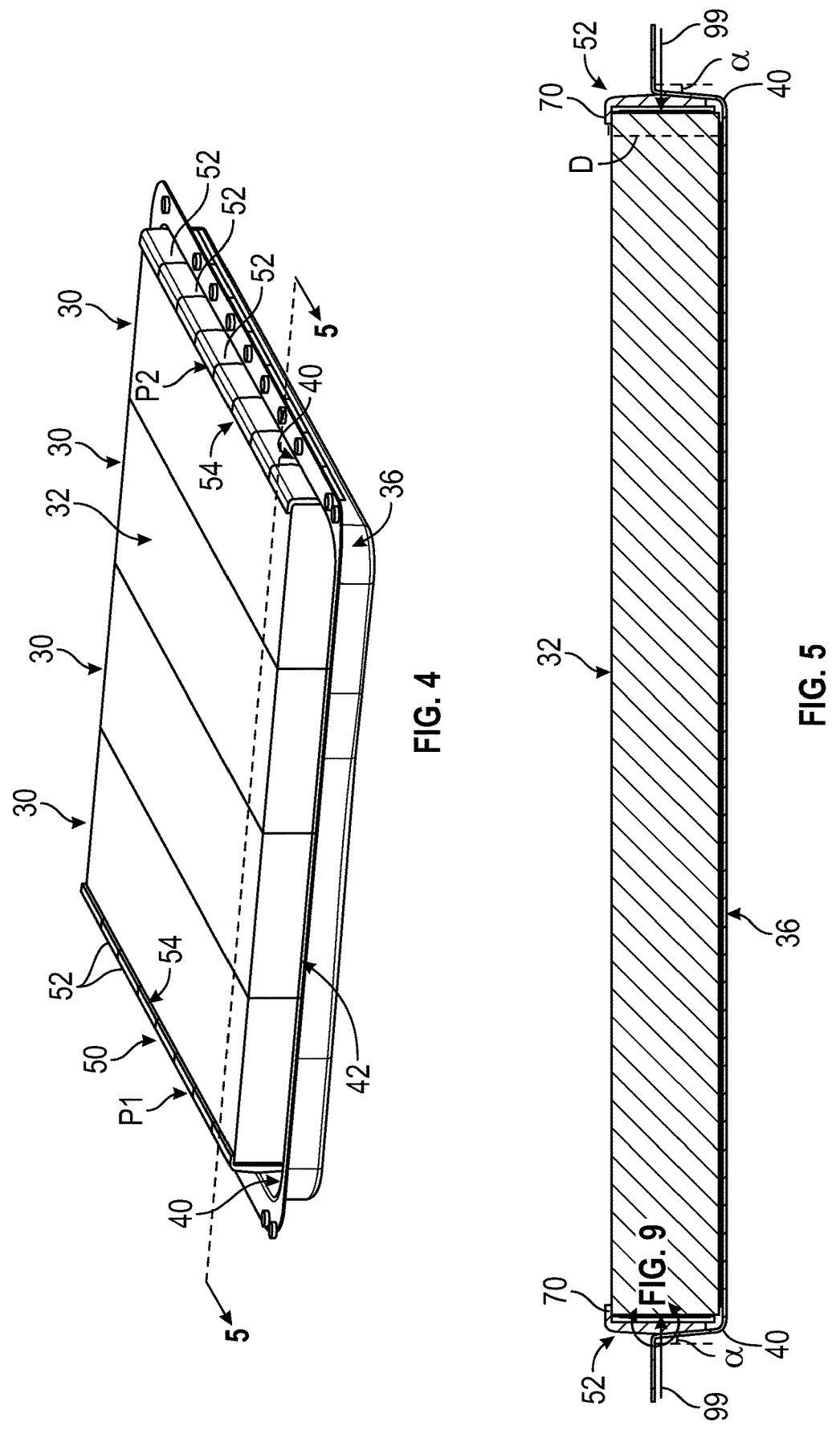
FIG. 4 illustrates a shim system for a traction battery pack having a cell-to-pack battery system.
FIG. 5 is a cross-sectional view through section 5-5 of FIG. 4.
FIG. 9 is a blown-up view of a portion of the construct shown in FIG. 5.
Figure 6:
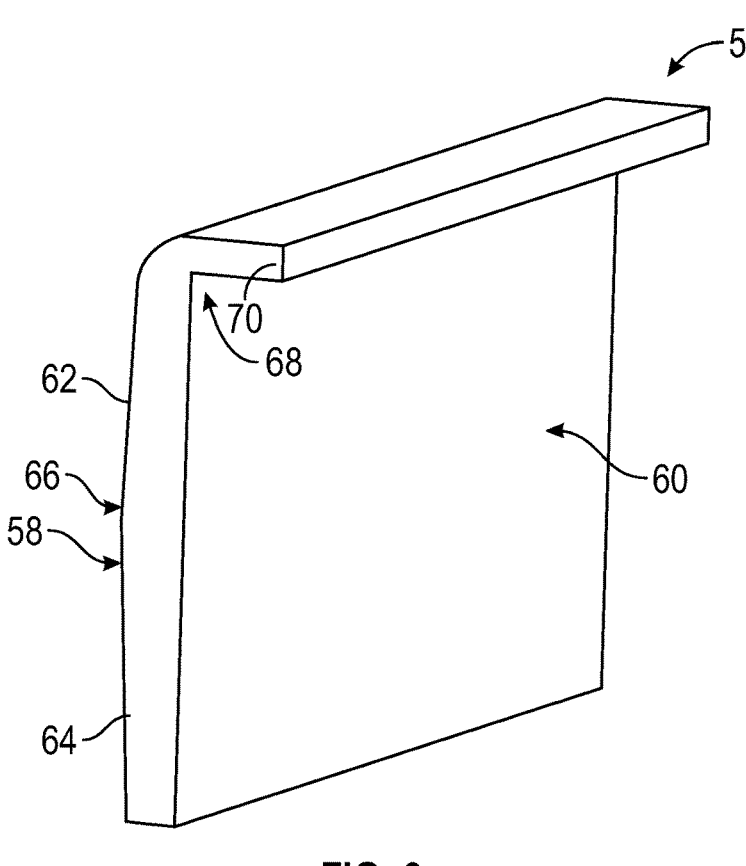
FIG. 6 is a perspective view of a wedge insert of the shim system of FIG. 4.
Figure 7:
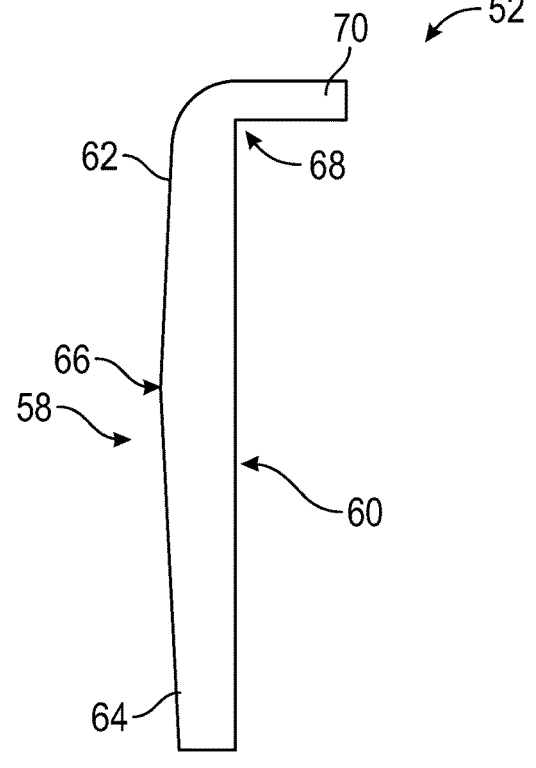
FIG. 7 is a front view of the wedge insert of FIG. 7.

Referring now primarily to FIGS. 5, 6, and 7, each wedge insert 52 of the shim system 50 may include a first side face 58 and a second side face 60. The first side face 58 may include a first profile, and the second side face 60 may include a second, different profile. The first profile of the first side face 58 may be configured to at least partially match the profile of the draft angle α of the side wall 40 of the enclosure tray 36, and the second profile of the second side face 60 may be configured to match the profile of one of the sides of the cell stack 30/cell matrix 32. Accordingly, in the exemplary embodiment, the first side face 58 includes a sloped or angled profile and the second side face 60 includes a substantially flat profile.

In an embodiment, the first side face 58 of the wedge insert 52 includes a first angled surface 62 and a second angled surface 64. The first and second angled surfaces 62, 64 may converge together at an apex 66 of the first side face 58. In an embodiment, the second angled surface 64 may be angled to match the profile of the draft angle α of the side wall 40.

The wedge inserts 52 may further include a stepped profile 68. The stepped profile 68 may be provided near an upper portion of the wedge insert 52 and may therefore connect to the first angled surface 62 of the first side face 58. The stepped profile 68 may establish a lip 70. When the wedge insert 52 is positioned between the enclosure tray 36 and the cell stack 30/cell matrix 32, the lip 70 may extend over top of a portion of the cell stack 30/cell matrix 32 for helping to retain a Z-axis position of the cell matrix 32 within the cell-compressing opening 42. In other implementations, the lip 70 may extend away from the cell stack 30/cell matrix 32 and rest against a portion of the enclosure tray 36. In this way, the wedge inserts 52 may be pre-placed into the enclosure tray 36 and held in place at least partly by the lip 70 to keep the wedge insert 52 from slipping into the enclosure tray 36 as the compressed cell stack 30 is inserted into the cell-compressing opening 42.

Referring to FIG. 9, each wedge insert 52 may be secured in place by an adhesive 72. For example, the adhesive 72 may be applied between the first side face 58 of the wedge insert 52 and the side wall 40 of the enclosure tray 36, and may be further applied between the second side face 60 of the wedge insert 52 and a side of the cell stack 30/cell matrix 32. Once cured, the adhesive 72 can retain the wedge insert 52 in place and add stiffness to the cell matrix 32. The adhesive 72 may be a structural adhesive such as an epoxy or any other suitable adhesive. In other implementations, the adhesive 72 could include one or more sections of two-sided adhesive tape.

The wedge inserts 52 may be polymer-based components. For example, the wedge inserts 52 could be constructed out of a hollow core polymer that includes structural ribbing adapted for resisting battery cell expansion loads imparted by the battery cells 26 of the cell stack 30/cell matrix 32. The hollow core polymer could alternatively be formed to resist a portion of the battery cell expansion loads imparted by the battery cells 26 while allowing for some deformation of the hollow core to accommodate cell swelling growth. Exemplary materials include but are not limited to a thermoset (e.g., sheet molding compound, bulk molding compound, etc.), or a fiber reinforced thermoplastic (e.g., polyamide with glass fiber filler). In other implementations, the wedge insert 52 could be formed of a metal component such as a sheet metal stamping that is added inside and welded to the enclosure tray structure to square up any non-square draft angles.

The exemplary traction battery packs of this disclosure include enclosure walls that incorporate draft angles and therefore include features (e.g., wedge inserts) that are configured to function as both a shim to adjust tolerance stack-ups and a wedge for controlling compression forces applied to interfacing battery cells. The wedge inserts provide solutions to various assembly complexities that can arise as a result of eliminating much of the array support structures and tray rigid cross members associated with conventional traction battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
an enclosure assembly including an enclosure tray,
a battery system housed within the enclosure assembly and including a cell matrix;
a wedge insert that establishes an interface between a draft angle of a side wall of the enclosure tray and the cell matrix, wherein the wedge insert includes a lip received over a top of a battery cell of the cell matrix; and
the wedge insert is secured directly to both the battery cell and the side wall.

2. The traction battery pack as recited in claim 1, wherein the wedge insert is secured to a minor side of the cell matrix.

3. The traction battery pack as recited in claim 2, wherein the wedge insert is secured to a cell stack of the cell matrix.

4. The traction battery pack as recited in claim 1, wherein the enclosure tray provides a cell-compressing opening for compressing the cell matrix.

5. The traction battery pack as recited in claim 4, wherein the side wall of the enclosure tray establishes part of the cell-compressing opening.

6. The traction battery pack as recited in claim 1, wherein the wedge insert includes a first side face that interfaces with the draft angle of the side wall and a second side face that interfaces with the cell matrix.

7. The traction battery pack as recited in claim 6, wherein the first side face includes a first profile and the second side face includes a second, different profile, and further wherein the first profile is sloped or angled and the second profile is flat.

8. The traction battery pack as recited in claim 6, comprising an adhesive disposed between the first side face and the side wall and further between the second side face and the cell matrix.

9. The traction battery pack as recited in claim 6, wherein the first side face includes a first angled surface and a second angled surface that converge together at an apex of the first side face.

10. The traction battery pack as recited in claim 1, wherein the wedge insert includes a stepped profile that establishes the lip.

11. The traction battery pack as recited in claim 1, comprising a second wedge insert that establishes a second interface between a second draft angle of a second side wall of the enclosure tray and the cell matrix, wherein the second wedge insert includes a second lip received over a top of a second battery cell of the cell matrix.

12. A traction battery pack, comprising:

an enclosure assembly including an enclosure tray, a battery system housed within the enclosure assembly and including a cell matrix;

a wedge insert that establishes an interface between a draft angle of a side wall of the enclosure tray and the cell matrix, wherein the wedge insert includes a lip received over a top of a battery cell of the cell matrix;

the wedge insert is secured directly to both the battery cell and the side wall; and a structural adhesive applied between a first side face of the wedge insert and the side wall and further between a second side face of the wedge insert and the battery cell.

\* \* \* \* \*